United States Patent
Hong

(10) Patent No.: US 8,295,283 B2
(45) Date of Patent: Oct. 23, 2012

(54) METHOD, SYSTEM, AND DEVICE FOR TRANSMITTING TRAU FRAME OVER A PACKET NETWORK

(75) Inventor: Jinsong Hong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 382 days.

(21) Appl. No.: 12/685,146

(22) Filed: Jan. 11, 2010

(65) Prior Publication Data

US 2010/0111090 A1     May 6, 2010

Related U.S. Application Data

(63) Continuation of application No. PCT/CN2008/072286, filed on Sep. 8, 2008.

(30) Foreign Application Priority Data

Sep. 17, 2007    (CN) .......................... 2007 1 0151246

(51) Int. Cl.
*H04L 12/28* (2006.01)
(52) U.S. Cl. ........................................ 370/392; 704/500
(58) Field of Classification Search .................. 370/392; 704/500
See application file for complete search history.

(56) References Cited

U.S. PATENT DOCUMENTS

| | | | |
|---|---|---|---|
| 6,879,599 B1 | 4/2005 | Galyas et al. | |
| 6,944,136 B2 * | 9/2005 | Kim et al. | 370/260 |
| 2002/0071654 A1 * | 6/2002 | Notoya et al. | 386/65 |
| 2003/0014705 A1 * | 1/2003 | Suzuki et al. | 714/748 |
| 2005/0187777 A1 * | 8/2005 | Chevallier et al. | 704/500 |

FOREIGN PATENT DOCUMENTS

| | | |
|---|---|---|
| CN | 1665317 A | 9/2005 |
| CN | 1929634 A | 3/2007 |
| CN | 1929634 A | 3/2007 |
| WO | 03/041344 A1 | 5/2003 |

OTHER PUBLICATIONS

English Translation of the Written Opinion of the International Searching Authority, PCT/CN2008/072286, Date of mailing Dec. 4, 2008, 4 pages.
Chinese Office Action, Application No. 200710151246.9, Dated Apr. 28, 2010, 10 pages.

* cited by examiner

*Primary Examiner* — Robert Wilson
*Assistant Examiner* — Wei Zhao
(74) *Attorney, Agent, or Firm* — Slater & Matsil, L.L.P.

(57) ABSTRACT

A method for transmitting a transcoder & rate adaptation unit (TRAU) frame over a packet network according to one embodiment of the present invention includes: receiving a packet TRAU (P_TRAU) frame sent from an opposite device; parsing the P_TRAU frame to obtain control information required for packet network transmission; and processing data in the P_TRAU frame according to the control information. A system and device for transmitting a TRAU frame over a packet network are also provided. With the P_TRAU frame that carries the control information required for packet network transmission, the Abis interface may use the packet mode instead of the time division multiplex (TDM) mode for transmission bearer and the delay, jitter, packet loss, and disorder in the packet mode are solved.

16 Claims, 4 Drawing Sheets

US 8,295,283 B2
METHOD, SYSTEM, AND DEVICE FOR TRANSMITTING TRAU FRAME OVER A PACKET NETWORK

CROSS-REFERENCE TO RELATED APPLICATIONS

This application is a continuation of International Application No. PCT/CN 2008/072286, filed on Sep. 8, 2008, which claim priority to Chinese Patent Application No. 200710151246.9, filed on Sep. 17, 2007, both of which are hereby incorporated by reference in their entireties.

FIELD OF THE INVENTION

The present invention relates to communication technologies, and in particular, to a method, system, and device for transmitting a transcoder & rate adaptation unit (TRAU) frame over a packet network.

BACKGROUND OF THE INVENTION

The global system for mobile communications (GSM) is the most widely used wireless communication system in the world and the number of users of the system is still increasing.

FIG. 1 shows an architecture of a traditional GSM system. In the architecture, an Abis interface is used between a base station controller (BSC) and a base transceiver station (BTS). FIG. 2 shows the structure of the Abis interface. In the prior art, the Abis interface is over a time division multiplex (TDM) network. Voice and packet data is generated as TRAU frames according to the 3rd Generation Partner Project (3GPP) protocol. A TRAU frame includes payload data bits, synchronization bits required in TDM mode, control bits, and padding bits for the normative frame structure.

Considering the wide deployment of IP networks, change of traffic models, network convergence, and transmission bearer cost, the traffic on the Abis interface needs to be carried over an IP packet network. When the traffic on the Abis interface is carried over an IP packet network, the following problems need to be solved: the packet network has different features from the TDM network, such as delay, jitter, and packet loss.

SUMMARY OF THE INVENTION

An embodiment of the present invention provides a method for transmitting a TRAU frame over a packet network. The method includes:
    receiving a packet TRAU (P_TRAU) frame sent from an opposite device;
    parsing the P_TRAU frame to obtain control information required for packet network transmission; and
    processing data in the P_TRAU frame according to the control information.

An embodiment of the present invention provides a device for transmitting a TRAU frame over a packet network. The processing device includes:
    a receiving unit, adapted to receive a P_TRAU frame sent from an opposite device;
    a parsing unit, adapted to parse the P_TRAU frame that the receiving unit receives from the opposite device to obtain control information in the P_TRAU frame; and
    a processing unit, adapted to process data in the P_TRAU frame according to the control information obtained by the parsing unit.

An embodiment of the present invention provides a system for transmitting a TRAU frame over a packet network. The processing system includes a BSC and a BTS that are connected through an Abis interface, where:
    the BTS is adapted to receive a downward Packet TRAU (P_TRAU) frame transmitted by the BSC and process data in the downward P_TRAU frame according to control information in the downward P_TRAU frame.

DETAILED DESCRIPTION OF THE INVENTION

The present invention is hereinafter described in detail with reference to embodiments and accompanying drawings.

Figure 1:
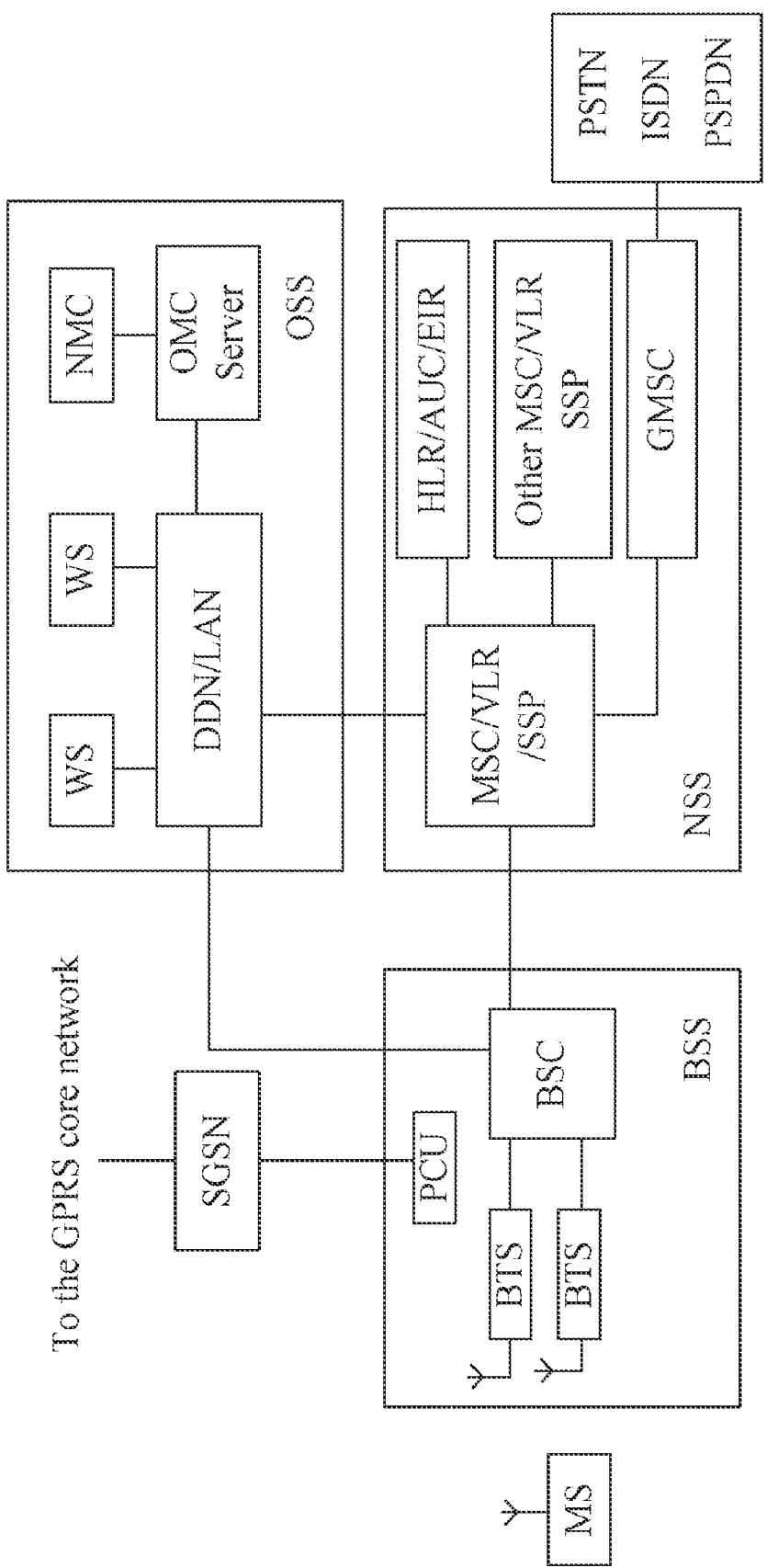
FIG. 1 shows a structure of a GSM system in the prior art.
Figure 2:
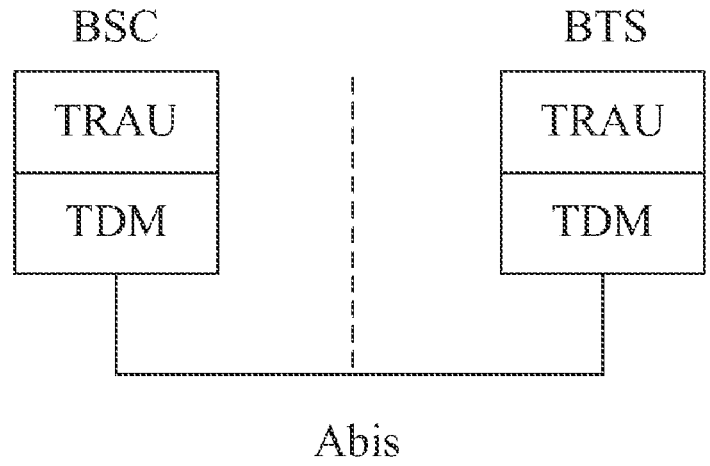
FIG. 2 shows a structure of an Abis interface in the prior art.
Figure 3:
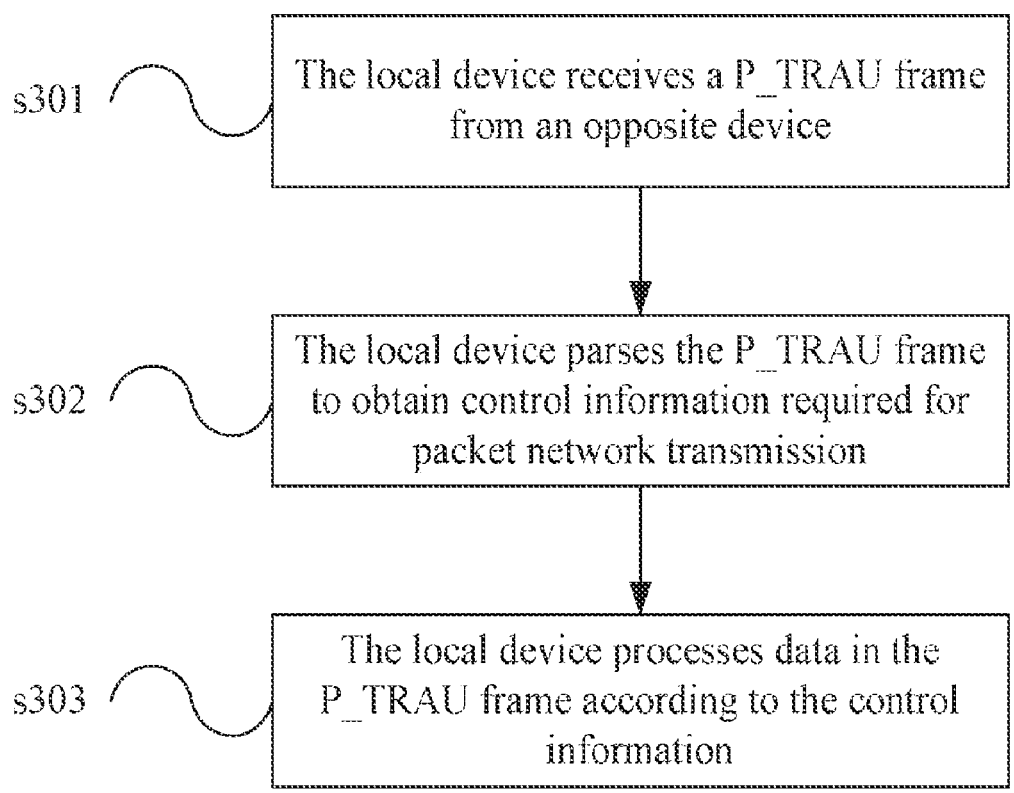
FIG. 3 shows a flowchart of a method for transmitting a TRAU frame over a packet network in one embodiment of the present invention.

An embodiment of the present invention provides a method for transmitting a TRAU frame over a packet network. As shown in FIG. 3, the method includes the following steps:

Step 301: The local device receives a P_TRAU frame sent from an opposite device.

The local device may be a BSC or a BTS and the opposite device may be a
BTS or a BSC accordingly. The P_TRAU frame is transmitted through the Abis interface between the BSC and the BTS.

Step 302: The local device parses the P_TRAU frame to obtain control information required for packet network transmission.

Compared with the conventional TRAU frame, the P_TRAU frame carries the control information required for packet network transmission. The control information includes time information and sequence number (SN) information to adapt to packet network transmission.

Step 303: The local device processes the data in the P_TRAU frame according to the control information.

With the P_TRAU frame that carries control information required for packet network transmission, the packet mode may be used instead of the TDM mode for transmission bearer, for example, the packet mode may be used over the Abis interface between the BSC and the BTS; and the delay, jitter, packet loss, and disorder in the packet mode are solved.

Specifically, the local device performs time restoration, packet loss processing, and disorder processing on the P_TRAU frame, and completes adaptive adjustment according to the delay and jitter measurement results to shorten the delay due to de-jitter. To control the jitter, the system performs delay compensation on the received P_TRAU frame. According to the delay compensation, and the time information in the frame, the system restores the delay of the TRAU frame. During delay compensation, the system may re-sort disordered frames according to the SN information in the frame. The delay of the system changes dynamically in the packet mode. Thus, to avoid prolonged delay because of a large de jitter buffer or avoid a high packet loss ratio because of a small de jitter buffer, the system uses a dynamic de-jitter buffer. The size of the de-jitter buffer depends on the delay changes of the last several frames received by the system.

The following describes embodiments of the present invention in detail with reference to a specific application scenario.

Figure 4:
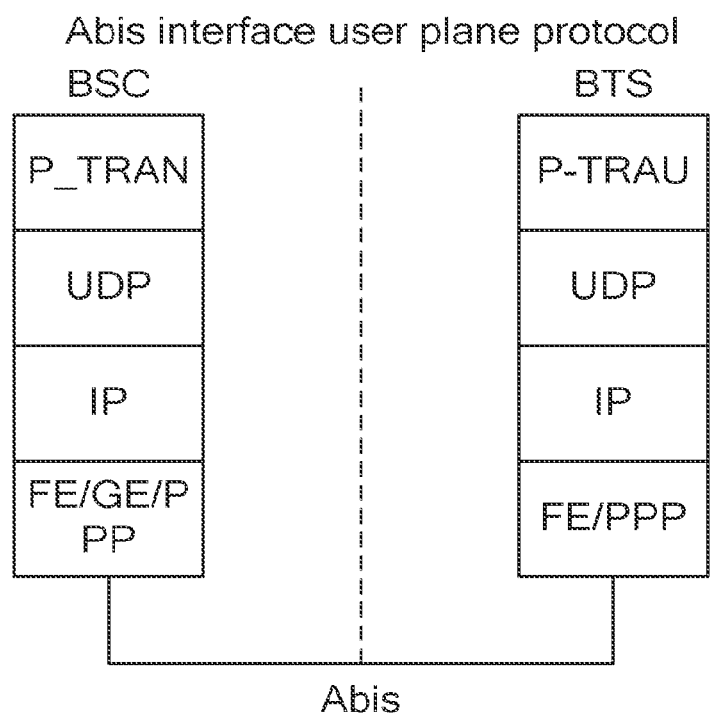
FIG. 4 shows an application scenario in one embodiment of the present invention.

FIG. 4 shows the schematic diagram of an application scenario in one embodiment of the present invention. The user plane of the Abis interface is over the User Datagram Protocol (UDP) and the traffic on the Abis interface is carried over an IP network. The BSC adopts a Fast Ethernet (FE) interface, a Gigabit Ethernet (GE) interface, or a Point-to-Point Protocol (PPP) interface. The BTS adopts an FE interface or a PPP interface.

Figure 5:
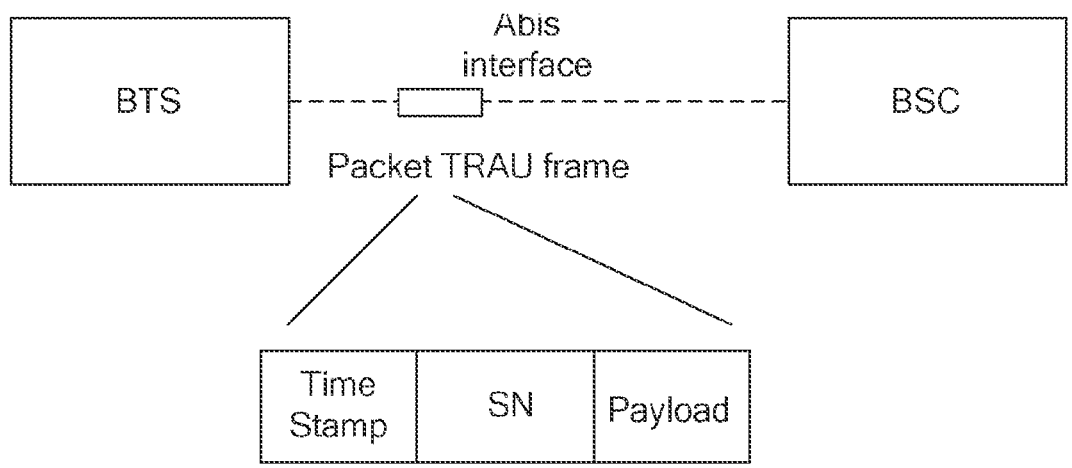
FIG. 5 shows a schematic diagram for packet network transmission between a BSC and a BTS in one embodiment of the present invention.

FIG. 5 shows the schematic diagram for packet network transmission between the BSC and the BTS. P_TRAU frames are transmitted between the BSC and the BTS. Different from the conventional TRAU frame, the P_TRAU frame includes a "Time Stamp" field, an "SN" field, and a "Payload" field. The "Time Stamp" field specifies the time information and is used to control the delay and jitter and restore the time at endpoints. The "SN" field specifies the SN information and is used to control the packet loss and disorder. Specifically, the "Time Stamp" field specifies the relative time of the system. In general, the time reference is same for each service flow of each session. The time precision is defined according to the synchronization time window of the BSC and BTS and the service type. The receiver restores the time and performs de-jitter according to the time information. The value of the "SN" field increases by 1 each time the sender sends a packet. The receiver uses the SN information to detect packet loss and disorder.

After obtaining the information of these fields, the local device processes the data in the received P_TRAU frame. Specifically, the local device performs time restoration and de-jitter of the data according to the obtained time information, processes the packet loss and disorder of the data according to the obtained SN information, and performs adaptive processing on the delay due to de-jitter.

In addition, different from the conventional TRAU frame, the P_TRAU frame does not include the information not required for packet network transmission, such as the synchronization bit that is required only in TDM mode, the control bit, and the padding bit for the normative frame structure.

The method for transmitting a TRAU frame over a packet network in embodiments of the present invention is used to reconstruct TRAU frames as P_TRAU frames. The "Time Stamp" and "SN" fields are added to the P_TRAU frame to adapt to the delay, jitter, packet loss, and disorder resulting from the processing mechanisms such as packet network transmission and BTS and BSC scheduling. Therefore, the transmission jitter, packet loss, and disorder resulting from Abis interface packetization are solved.

Detailed above is just one specific application scenario of the present invention. In actual applications, the user plane of the Abis interface may also use other transmission modes such as UDP/IP, frame relay (FR), and high-level data link control (HDLC).

Figure 6:
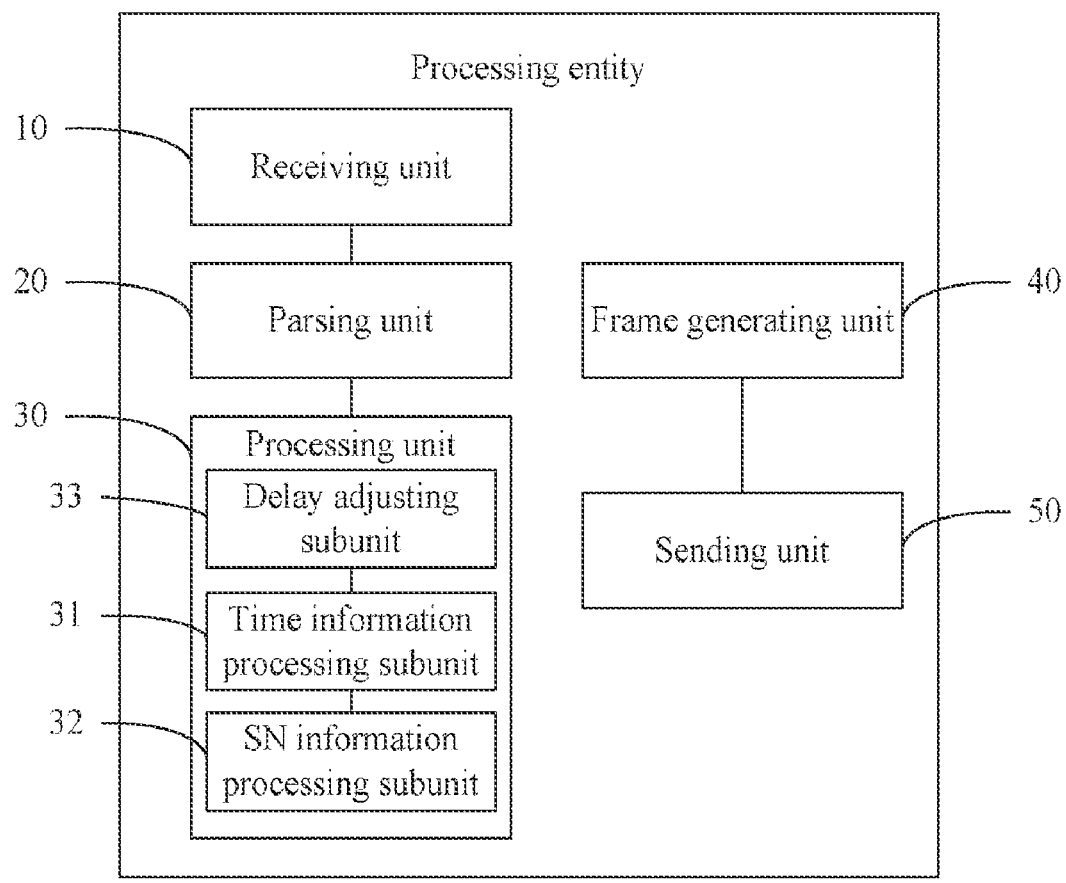
FIG. 6 shows a structure of a device for transmitting a TRAU frame over a packet network in one embodiment of the present invention.

One embodiment of the present invention provides a device for transmitting a TRAU frame over a packet network. As shown in FIG. 6, the device includes:

a receiving unit 10, adapted to receive a P_TRAU frame sent from an opposite device;

a parsing unit 20, adapted to parse the P_TRAU frame received by the receiving unit 10 from the opposite device to obtain control information from the P_TRAU frame, where the control information includes time information and SN information; and a processing unit 30, adapted to process data in the P_TRAU frame according to the control information obtained by the parsing unit 20.

The processing unit 30 may further include:

a time information processing subunit 31, adapted to perform time restoration and de-jitter according to the time information obtained by the parsing unit 20;

an SN information processing subunit 32, adapted to process the packet loss and disorder according to the SN information obtained by the parsing unit 20; and a delay adjusting subunit 33, adapted to perform adaptive processing on the de jitter performed by the time information processing subunit 31 and the delay due to the de-jitter.

The device may also include:

a frame generating unit 40, adapted to add control information required for packet network transmission to a P_TRAU frame to be sent, where the control information includes time information and SN information; and a sending unit 50, adapted to send the P_TRAU frame generated by the frame generating unit 40 to an opposite device.

One embodiment of the present invention provides a system for transmitting a TRAU frame over a packet network. The system includes a BSC and a BTS. The device described in the above-mentioned embodiment is installed on the BSC and BTS respectively to transmit the TRAU frame over the packet network. The structure of the device is described in the above-mentioned embodiment and is not described further.

The system and device for transmitting a TRAU frame over a packet network in embodiments of the present invention are used to reconstruct TRAU frames as P_TRAU frames. The "Time Stamp" and "SN" fields are added to the P_TRAU frame to adapt to the delay, jitter, packet loss, and disorder resulting from the processing mechanisms such as packet network transmission and BTS and BSC scheduling. All these solve the transmission jitter, packet loss, and disorder resulting from Abis interface packetization.

Based on the descriptions of the preceding embodiments, those skilled in the art may understand that the present invention may be implemented by hardware or by software and a necessary universal hardware platform. Based on such understandings, the technical solution of the present invention may be embodied in a software product. The software product may be stored in a nonvolatile storage medium such as a compact disk-read only memory (CD-ROM), a random access memory (RAM), a USB disk or a mobile hard disk, and incorporates several instructions to instruct a computer device such as a personal computer (PC), a server, or a network device to execute the method provided in each embodiment of the present invention.

Although the present invention has been described through several exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. A method for transmitting a transcoder & rate adaptation unit (TRAU) frame over a packet network, the method comprising:

receiving a Packet TRAU (P_TRAU) frame from an opposite device;

parsing the P_TRAU frame to obtain control information required for packet network transmission, wherein the control information comprises time information and sequence number (SN) information; and using the time information to delay data carried in the P_TRAU frame in order to de-litter data as well as restore proper timing of data carried in the P_TRAU frame; and using the SN information to correct the order and replace lost data in the P_TRAU frame.

2. The method according to claim 1, wherein the time information is carried in a Time Stamp field of the P_TRAU frame; and the sequence number information is carried in a Sequence Number field of the P_TRAU frame.

3. The method according to claim 1, wherein the method further comprises:

performing adaptive processing on delay resulted from the de-jitter of the data carried in the P_TRAU frame.

4. The method according to claim 1, wherein control information required in time division multiplex (TDM) mode and/or data information required in TDM mode is not contained in the P_TRAU frame.

5. A device for transmitting a transcoder & rate adaptation unit (TRAU) frame over a packet network, the device comprising:

a receiving unit adapted to receive a Packet TRAU (P_TRAU) frame from an opposite device;

a parsing unit adapted to parse the P_TRAU frame received by the receiving unit from the opposite device to obtain control information in the P_TRAU frame, wherein the control information comprises time information and sequence number (SN) information; and a processing unit adapted to use the time information to delay data carried in the P_TRAU frame in order to de-jitter data as well as restore proper timing of data carried in the P_TRAU frame; and use the SN information to correct the order and replace lost data in the P_TRAU frame.

6. The device according to claim 5, wherein the processing unit comprises:

a time information processing subunit adapted to perform the time restoration and the de-jitter of data carried in the P_TRAU frame according to the time information obtained by the parsing unit; and an SN information processing subunit adapted to process the packet loss and the disorder of data carried in the P_TRAU frame according to the SN information obtained by the parsing unit.

7. The device according to claim 6, wherein the processing unit further comprises:

a delay adjusting subunit adapted to perform adaptive processing on the de-jitter performed by the time information processing subunit and delay resulted from the de-jitter.

8. The device according to claim 5, wherein the device further comprises:

a frame generating unit adapted to generate a P_TRAU frame to be sent to the opposite device, wherein control information required for packet network transmission is carried in the P_TRAU frame to be sent to the opposite device; and a sending unit adapted to send the P_TRAU frame generated by the frame generating unit to the opposite device.

9. The device according to claim 5, wherein the device is a base station controller (BSC) and the opposite device is a base transceiver station (BTS).

10. The device according to claim 5, wherein the device is a base transceiver station (BTS) and the opposite device is a base station controller (BSC).

11. A system for transmitting a transcoder & rate adaptation unit (TRAU) frame over a packet network, the system comprising:

a base station controller (BSC) and a base transceiver station (BTS), wherein the BSC and the BTS are communicatively connected through an Abis interface, and wherein the BTS or the BSC is adapted to receive a downward Packet TRAU (P_TRAU) frame transmitted by the BSC or the BTS, wherein time information and sequence number (SN) information are carried in the P_TRAU frame, use the time information to delay data carried in the P_TRAU frame in order to de-jitter data as well as restore proper timing of data carried in the P_TRAU frame; and use the SN information to correct the order and replace lost data in the P_TRAU frame.

12. The system according to claim 11, wherein the time information is carried in a Time Stamp field of the P_TRAU frame, and the sequence number information is carried in a Sequence Number field of the P_TRAU frame.

13. The system according to claim 11, wherein the BTS or the BSC is further adapted to perform adaptive processing on delay resulted from the de-jitter of data carried in the P_TRAU frame.

14. The system according to claim 11, wherein the BTS or the BSC is further adapted to add control information required for packet network transmission to a P_TRAU frame to be sent to the BTS or the BSC.

15. The device according to claim 5, wherein the time information is carried in a Time Stamp field of the P_TRAU frame; and the sequence number information is carried in a Sequence Number field of the P_TRAU frame.

16. The method according to claim 1, wherein the method further comprises:

adding control information required for packet network transmission to a P_TRAU frame to be sent to the opposite device; and sending the P_TRAU frame to the opposite device.

* * * * *